(12) United States Patent
Ekle (10) Patent No.: US 10,303,891 B2
(45) Date of Patent: May 28, 2019

(54) AUTOMATED MANUFACTURING SYSTEM WITH JOB PACKAGING MECHANISM AND METHOD OF OPERATION THEREOF

(71) Applicant: Data I/O Corporation, Redmond, WA (US)

(72) Inventor: Taylor Carl Ekle, Redmond, CA (US)

(73) Assignee: Data I/O Corporation, Redmond, WA (US)

( * ) Notice: Subject to any disclaimer, the term of this patent is extended or adjusted under 35 U.S.C. 154(b) by 371 days.

(21) Appl. No.: 14/945,399

(22) Filed: Nov. 18, 2015

(65) Prior Publication Data

US 2016/0187870 A1 Jun. 30, 2016

Related U.S. Application Data

(60) Provisional application No. 62/098,252, filed on Dec. 30, 2014.

(51) Int. Cl.
*G06F 21/62* (2013.01)
*G06F 21/12* (2013.01)
*G05B 19/418* (2006.01)

(52) U.S. Cl.
CPC ..... *G06F 21/6209* (2013.01); *G05B 19/4185* (2013.01); *G06F 21/121* (2013.01); *G05B 2219/36542* (2013.01); *Y02P 90/12* (2015.11); *Y02P 90/18* (2015.11)

(58) Field of Classification Search
CPC ...... G06F 21/10; G06F 21/105; G06F 21/121; G06F 21/44; G06F 21/6209; G06F 25/55; G05B 19/4185; Y02P 90/12; Y02P 90/18

USPC ............ 700/181, 9, 65, 95, 286; 726/26, 27
See application file for complete search history.

(56) References Cited

U.S. PATENT DOCUMENTS

| 6,657,426 | B1 | 12/2003 | Powell et al. |
| 7,188,282 | B2 | 3/2007 | Walmsley |
| 7,707,571 | B1 * | 4/2010 | Harris ........................ G06F 8/61 |
| | | | 717/174 |
| 9,071,446 | B2 | 6/2015 | Kreft |
| 2004/0025022 | A1 * | 2/2004 | Yach ...................... G06F 21/121 |
| | | | 713/176 |

(Continued)

FOREIGN PATENT DOCUMENTS

| CN | 1860420 A | 11/2006 | |
| WO | WO 2014/111587 * | 7/2014 | ............... H04L 9/00 |

OTHER PUBLICATIONS

European Patent Office, Application No. 15876196.5, Extended European Search Report dated Sep. 8, 2017.

(Continued)

*Primary Examiner* — Tan T. Nguyen
(74) *Attorney, Agent, or Firm* — Wong & Rees LLP (57) ABSTRACT

An automated manufacturing system, and a method of operation thereof, including: a job creator for generating a device programming job by encrypting a file based on an input component, the input component including an instruction set; a distribution network for distributing the device programming job to a manufacturing site; an assembly controller for decrypting the device programming job at an authorized manufacturing site; and an intelligent module for executing the device programming job decrypted by the assembly controller at the authorized manufacturing site for programming an assembly device.

18 Claims, 4 Drawing Sheets

(56) References Cited

U.S. PATENT DOCUMENTS

| | | | |
|---|---|---|---|
| 2004/0243481 A1 | 12/2004 | Bradbury et al. | |
| 2005/0039040 A1* | 2/2005 | Ransom | G01R 22/066 |
| | | | 726/6 |
| 2007/0028101 A1* | 2/2007 | Koskins | G06F 21/121 |
| | | | 713/165 |
| 2007/0136818 A1 | 6/2007 | Blumberg et al. | |
| 2007/0136878 A1 | 6/2007 | Streit et al. | |
| 2008/0282357 A1* | 11/2008 | Sharpe | G06F 21/10 |
| | | | 726/27 |
| 2009/0220078 A1* | 9/2009 | Campbell | G06F 21/64 |
| | | | 380/251 |
| 2010/0325734 A1* | 12/2010 | Etchegoyen | G06F 21/121 |
| | | | 726/26 |
| 2013/0198859 A1* | 8/2013 | Atkinson | G06F 21/10 |
| | | | 726/27 |
| 2014/0108825 A1 | 4/2014 | O'Loughlin et al. | |
| 2014/0337985 A1 | 11/2014 | Muyshondt | |
| 2014/0351584 A1* | 11/2014 | Checcucci | G06F 21/105 |
| | | | 713/164 |
| 2015/0094868 A1* | 4/2015 | Diab | G05B 19/4185 |
| | | | 700/286 |
| 2015/0277887 A1* | 10/2015 | Hoch | G06F 8/61 |
| | | | 713/171 |
| 2015/0317151 A1* | 11/2015 | Falcy | H04L 67/28 |
| | | | 717/173 |
| 2015/0350278 A1* | 12/2015 | Isbjornssund | H04L 9/00 |
| | | | 700/98 |

OTHER PUBLICATIONS

European Patent Office, Application No. 15876196.5, Pending Claims dated Sep. 8, 2017.

International Search Report and Written Opinion for PCT Application No. PCT/US2015/067920 dated Mar. 29, 2016.

European Patent Office, Application No. 158761965, Foreign Office Action dated Jul. 11, 2018.

Chinese Patent Office, Application No. 2015800758638, Foreign Office Action dated Dec. 24, 2018.

* cited by examiner

AUTOMATED MANUFACTURING SYSTEM WITH JOB PACKAGING MECHANISM AND METHOD OF OPERATION THEREOF

CROSS-REFERENCE TO RELATED APPLICATION(S)

This application claims the benefit of U.S. Provisional Patent Application Ser. No. 62/098,252 filed Dec. 30, 2014, and the subject matter thereof is incorporated herein by reference thereto.

TECHNICAL FIELD

The present invention relates generally to automated systems, and more particularly to automated manufacturing systems.

BACKGROUND ART

Most of the world's electronic manufacturers do not possess the ability to build highly proficient multi-module automated processing systems, such as a manufacturing system, that contain fully integrated robotics systems. There is a desire to standardize manufacturing processes across multiple manufacturing sites world-wide. In order to preserve proprietary manufacturing information and client intellectual property, many costly security processes must be put in place to assure the information only goes to authorized manufacturing sites.

The risks of exposure or proprietary manufacturing processes and client intellectual property can restrict product manufacturing to dedicated sites. This can restrict the available volumes of products without regard to potential increased demand and dwindling supplies.

Some manufacturing capacity can be underutilized because the required processes and intellectual property cannot be transferred to additional sites. The exposure of loss of a manufacturing process or the client intellectual property is too great for unsecured movement between manufacturing facilities. Compromise of the manufacturing process or the client's intellectual property can represent a business calamity that could ruin the manufacturer's reputation and risk future business opportunity.

Thus, a need still remains for an automated manufacturing system with job packaging that can effectively protect the manufacturing process and the client's intellectual property, while being able to distribute the workload across multiple sites as required to meet the client's manufacturing needs. In view of the ever-increasing need to save costs and improve efficiencies, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

Embodiments of the present invention provide a method of operation of an automated manufacturing system including: generating a device programming job by encrypting a file based on an input component, the input component including an instruction set; distributing the device programming job to a manufacturing site; decrypting the device programming job at an authorized manufacturing site; and executing the device programming job decrypted by an assembly controller at the authorized manufacturing site for programming an assembly device.

The embodiments of the present invention provide an automated manufacturing system, including: a job creator for generating a device programming job by encrypting a file based on an input component, the input component including an instruction set; a distribution network for distributing the device programming job to a manufacturing site; an assembly controller for decrypting the device programming job at an authorized manufacturing site; and an intelligent module for executing the device programming job decrypted by the assembly controller at the authorized manufacturing site for programming an assembly device.

Certain embodiments of the invention have other steps or elements in addition to or in place of those mentioned above. The steps or the elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention, and it is to be understood that other embodiments would be evident based on the present disclosure and that process or mechanical changes may be made without departing from the scope of the embodiments of the present invention.

In the following description, numerous specific details are given to provide a thorough understanding of the invention. However, it will be apparent that the invention may be practiced without these specific details. In order to avoid obscuring the embodiments of the present invention, some well-known system configurations, and process steps are not disclosed in detail. Likewise, the drawings showing embodiments of the invention are semi-diagrammatic and not to scale and, particularly, some of the dimensions are for the clarity of presentation and are shown exaggerated in the drawing FIGs. In addition, where multiple embodiments are disclosed and described having some features in common, for clarity and ease of illustration, description, and comprehension thereof, similar and like features one to another will ordinarily be described with like reference numerals.

Figure 1:
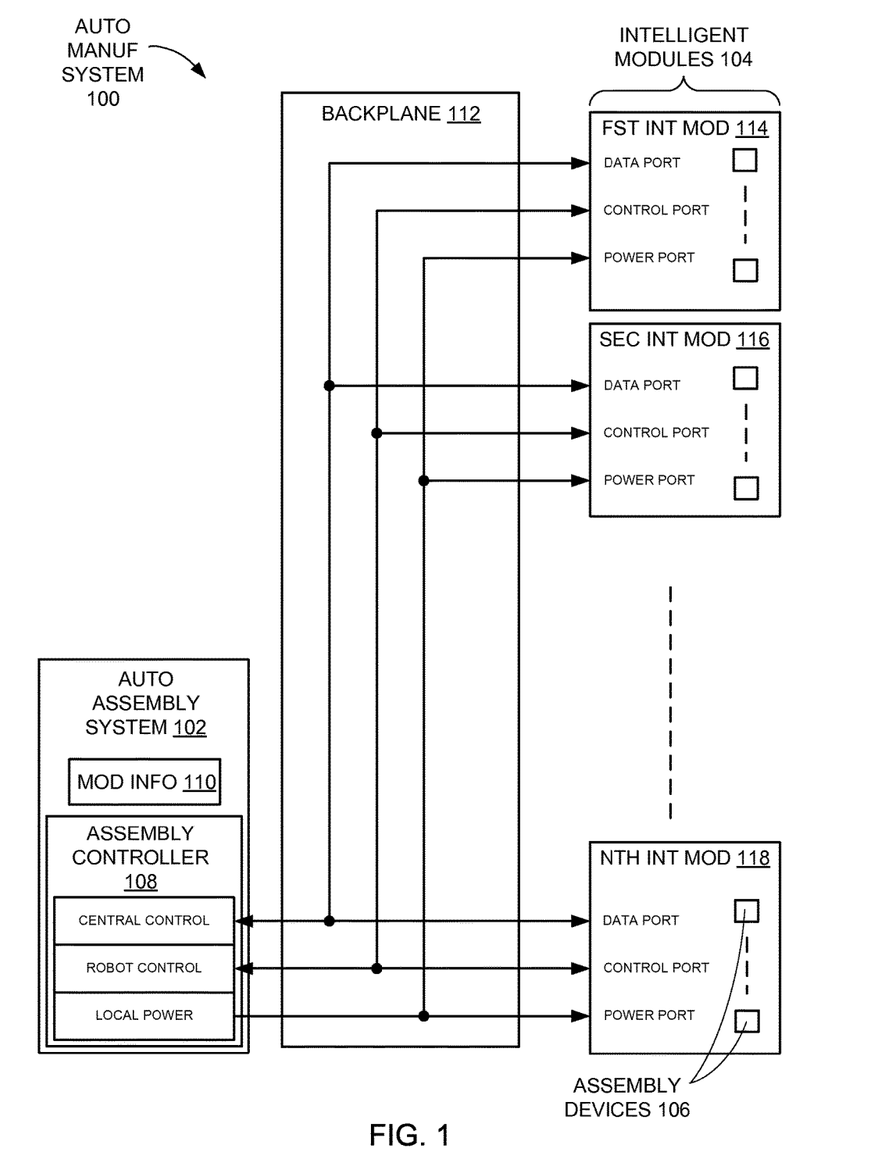
FIG. 1 is a functional block diagram of an automated manufacturing system in accordance with an embodiment of the present invention.

Referring now to FIG. 1, therein is shown a functional block diagram of an automated manufacturing system 100 in accordance with an embodiment of the present invention. The automated manufacturing system 100 includes an automated assembly system 102 that provides programming jobs, which are self-contained, secure, and portable.

The automated assembly system 102 includes an automatic receptacle mapping feature. The automatic receptacle mapping feature automatically measures physical characteristics and geometries of receptacles. For example, the physical characteristics or the geometries can include numbers of rows and columns, row offsets and pitches, and column offsets and pitches.

These automatic measurements provide information about coordinates for a center of a pocket within one of the receptacles. For example, the coordinates relate to X, Y, Z and theta directions or only X and Y directions. Also for example, the center of the pocket within one of the receptacles can include a location of one of intelligent modules 104. The intelligent modules 104 can represent device programmers for programming assembly devices 106. The assembly devices 106 can be positioned within the receptacles.

For example, the automatic receptacle mapping feature employs optical methods based upon changes of states including reflectivity. Also for example, the automatic receptacle mapping feature employs specifically designed algorithms to calculate a location, geometry, and physical characteristics of the receptacles.

It has been discovered that the automatic receptacle mapping feature is designed in such a way that an operator of the automated assembly system 102 no longer has to manually enter the physical characteristics and the geometry of the receptacles, which saves the operator time and prevents operator input errors.

Additionally, the automated manufacturing system 100 has been configured to accept the intelligent modules 104 with an intelligent design. The intelligent modules 104 are configured to interface with an assembly controller 108 in the automated assembly system 102. The automated assembly system 102 immediately recognizes module information 110 of the intelligent modules 104.

For example, the module information 110 can include identifications and locations of the intelligent modules 104 within the automated manufacturing system 100 or a feeder bank of the automated manufacturing system 100. Also for example, the identifications can include types, configurations, and geometries of the intelligent modules 104.

Further, for example, configuration information about the intelligent modules 104 provides socket counts, socket pitches, socket offsets, socket locations, and a number of programming sites. On the other hand, an intelligently designed tape module, which is different from the intelligent modules 104, can simply provide information about a pocket offset.

The functional block diagram shows a power and communication diagram of a backplane 112 connecting the assembly controller 108 with a number of the intelligent modules 104, such as a first intelligent module 114, a second intelligent module 116, and an Nth intelligent module 118, where N represents any module number greater than one. The backplane 112 provides a communication interface with data, control, and power for a smart interface system. For example, the backplane 112 provides a transmission interface for the first intelligent module 114, the second intelligent module 116, and the Nth intelligent module 118.

Each of the intelligent modules 104 includes a data port, a control port, and a power port. Track identification information, including a physical location, of each of the intelligent modules 104, is transmitted through the control port. As an exemplary illustration, the data port can be used to broadcast device image data, send commands, and receive status information for programming operations. Due to a volume of data transmitted by the data port, a high-speed port, such as an Ethernet connection can be employed.

Any of the intelligent modules 104 that involve with transmission of large amounts of data can use the data port. The control port can be used to transmit commands to and status from the intelligent modules 104. The power port transmits power to each of the intelligent modules 104 through the backplane 112. A power supplied to each of the intelligent modules 104 via the power port can be electrical, but in principle, can be mechanical, pneumatic, hydraulic, magnetic, optical, or chemical.

The data port, the control port, and the power port are collectively referred to as a composite connection. As the composite connection can protrude from each of the intelligent modules 104, a mechanical protection scheme can be designed to protect the composite connection from accidental damages.

The composite connection can also employ a hardware-based naming format. This format can allow configurable hardware switches on each of the intelligent modules 104 that not only differentiate by types of the intelligent modules 104 but also by a serial number of each of the intelligent modules 104.

The composite connection, when coupled to the smart interface system, can employ a mechanical fit connection that includes pins and spring-loaded washers. Each of the intelligent modules 104 can use an identical set pitch for the pins of the composite connection. This type of configuration provides for uniform mounting and consistent registration for each composite connection.

Additionally, pin and spring-loaded washer types of connections establish a reliable and repeatable tool-less installation with minimal time. Each of the intelligent modules 104 can be installed by merely establishing preliminary contact and then registering or locking in place.

The data port, the control port, and the power port of each of the intelligent modules 104 align or connected with a central control, a robot control, and a local power, respectively, within the assembly controller 108. The assembly controller 108 functions as a processing component for receiving and transmitting information between a non-text user interface system and each of the intelligent modules 104.

The control port includes a track information system for communicating the track identification information with the backplane 112. The track identification information can include a unique identification number and a unique location designation. For example, each of the first intelligent module 114, the second intelligent module 116, and the Nth intelligent module 118 can possess an ability to transmit track information.

A protocol that delivers information through the data port and the control port is a bi-directional protocol. For example, the protocol can be implemented with hardware, software, or a combination thereof.

Also for example, the data port can use an Ethernet port, and the control port can use a Controller Area Network (CAN) port with a hard coded segment for carrying the track identification information. The bi-directional protocol allows for data and control (digital and analog) communication. Each of the intelligent modules 104 can use the protocol to enhance interchangeability within the automated manufacturing system 100.

The protocol can also employ a multiple master system, which allows any component within the automated manufacturing system 100 to request or send data. For example, an input module can request data from one of programming modules without any need for a robot controller within the assembly controller 108 to initiate a transverse request.

The protocol also includes a messaging system, which can relay information between components. For example, the messaging system can relay information about whether or not socket adapters are opened or closed and what type of the intelligent modules 104 are installed within the automated manufacturing system 100.

The messaging system can include a prioritized messaging system based on a CAN protocol. The embodiments of the present invention employ a unique set of CAN messages. All messages within a CAN system are based on a message number, with lower numbered messages receiving the higher priority. So, if two of the messages are sent simultaneously, one of the messages with the lowest number can get through and processed first, and the other message has to wait to be retransmitted at a later time or date.

Figure 2:
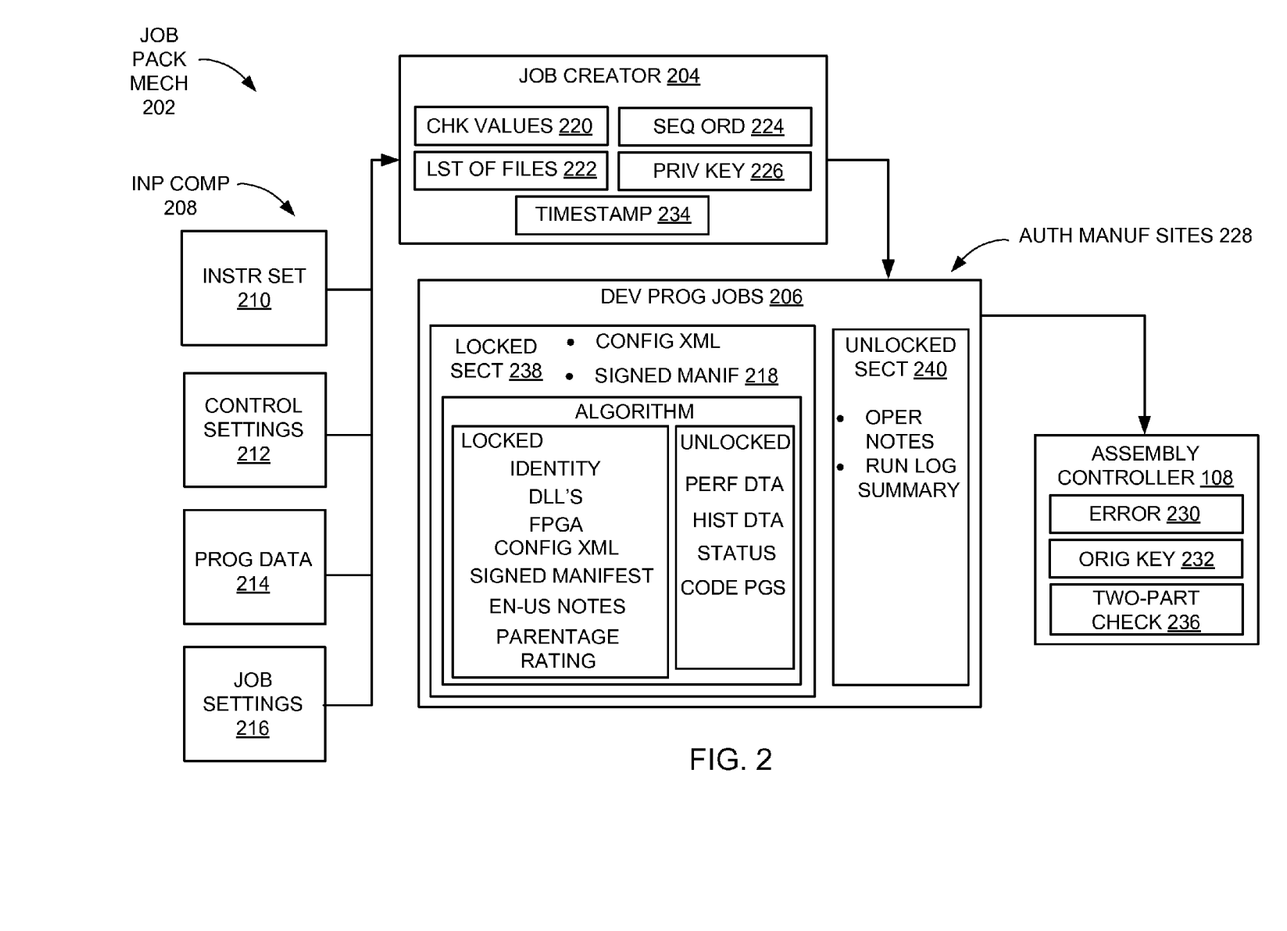
FIG. 2 is a functional block diagram of a job packaging mechanism of the automated manufacturing system of FIG. 1.

Referring now to FIG. 2, therein is shown a functional block diagram of a job packaging mechanism 202 of the automated manufacturing system 100 of FIG. 1. The functional block diagram depicts a job creator 204 for packaging or generating device programming jobs 206.

The functional block diagram depicts an example of a typical job and algorithm package locked and unlocked areas. The term "locked" as used herein refers to encrypted. The term "unlocked" as used herein refers to not encrypted.

The functional block diagram depicts input components 208 input to the job creator 204. The job creator 204 can output the device programming jobs 206 having all information based on the input components 208 to set-up and execute automated assembly jobs at any manufacturing site that has the automated assembly system 102 of FIG. 1. The device programming jobs 206 can represent packaged jobs or manufacturing jobs.

The device programming jobs 206 are created to include all necessary files based on the input components 208 to run a specific programming job. For example, the files can include customer images, customer settings, and algorithms used for the specific programming job. The files are bundled up into a package and the package is signed so that tempering with the files would result in an error status when the files are loaded on the intelligent modules 104 of FIG. 1.

When the device programming jobs 206 are to be run or executed, four of the input components 208 are available or provided to successfully run the device programming jobs 206. The input components 208 can include an instruction set 210, which is information for controlling a device programmer.

The instruction set 210 includes algorithms or lists of instructions or commands for controlling the intelligent modules 104. The instruction set 210 is a file that is specifically created to instruct the assembly devices 106 of FIG. 1 on how to communicate and use features of the assembly devices 106.

The input components 208 can include control settings 212, which are parameters used by or with the instruction set 210. The control settings 212 include algorithm settings. The control settings 212 can be used to turn on and off the features of the assembly devices 106. For example, the features can include Erase or an Identification (ID) check within a feature list of the assembly devices 106.

The input components 208 can include program data 214, which is information used for programming an assembly of an end product. The program data 214 include user data files. The program data 214 can include an intellectual property or proprietary information provided only by a user of the automated manufacturing system 100.

The input components 208 can include job settings 216, which is information pertaining to the device programming jobs 206. The job settings 216 can include names of the device programming jobs 206, notes relevant to the device programming jobs 206, and ranges that specify where the intellectual property provided can be used.

When the job creator 204 saves the device programming jobs 206, all four of the input components 208 of each of the device programming jobs 206 are bundled up and saved into a signed manifest 218 to prevent tampering of the device programming jobs 206. The signed manifest 218 is information that is secure and available to be used to successfully run the device programming jobs 206.

The signed manifest 218 is created in the following steps. Check values 220 are determined. For example, the check values 220 can be generated using 32-bit circular redundancy check (CRC32) values, hash functions based on polynomial divisions, or any other methods using cyclic redundancy codes, checks, or checksums. The check values 220 can be individually generated for each of the instruction set 210, the control settings 212, the program data 214, and the job settings 216 that are included in the signed manifest 218.

A list of files 222 can be generated using the instruction set 210, the control settings 212, the program data 214, and the job settings 216 to create the signed manifest 218. The list of the files 222 can be generated by serializing contents of the instruction set 210, the control settings 212, the program data 214, and the job settings 216. The term "serializing" used herein refers to generating information in a sequential manner using a predetermined order.

For example, the list of the files 222 can be serialized by information in a sequential order 224 of the instruction set 210, the control settings 212, the program data 214, and the job settings 216 along with the check values 220 thereof. As a specific example, the list of the files 222 can be serialized by the sequential order 224 of the instruction set 210, a first of the check values 220 for the instruction set 210, the control settings 212, a second of the check values 220 for the control settings 212, the program data 214, a third of the check values 220 for the program data 214, the job settings 216, and a fourth of the check values 220 for the job settings 216.

The list of the files 222 that has been serialized can be signed for security purposed to prevent the device programming jobs 206 from being tempered. The list of the files 222 can be signed or encrypted using a private key 226. The private key 226 is information used for an encryption and/or decryption known only to the automated manufacturing system 100 or the automated assembly system 102 that exchanges secret messages.

The private key 226 can be appended to the list of the files 222 that has been serialized so that the private key 226 can be sent immediately right after the list of the files 222 that has been serialized is sent. Also for example, the private key 226 can include a private Digital Signature Algorithm (DSA) key. The signed manifest 218 can be saved into the device programming jobs 206.

When the device programming jobs 206 are read back or processed by the assembly controller 108 at authorized manufacturing sites 228, the assembly controller 108 uses the signed manifest 218 to determine whether anything has been tampered with the device programming jobs 206. The authorized manufacturing sites 228 are locations to which the device programming jobs 206 are sent, and the device programming jobs 206 are only allowed to be executed at these locations. The assembly controller 108 at the authorized manufacturing sites 228 decrypts the device programming jobs 206.

If a file in the list of the files 222 has been changed, the check values 220 do not match, and software of the assembly controller 108 detects an alteration of the file and produces an error 230, which prevents the device programming jobs 206 from being decrypted by the assembly controller 108. If the signed manifest 218 has been changed, a signed key or the private key 226 used by the encryption does not match an original key 232 used by the decryption in the assembly controller 108.

As a result, the software of the assembly controller 108 for the decryption of the device programming jobs 206 fails and generates the error 230. If the list of the files 222 and the signed manifest 218 have not been changed, the device programming jobs 206 are executed by the intelligent modules 104 at the authorized manufacturing sites 228 after the device programming jobs 206 are successfully decrypted without the error 230.

It is understood that the private key 226 can incorporate a timestamp 234 so that no possibility exists to alter the device programming jobs 206 without detection by the automated manufacturing system 100. In the event an unauthorized manufacturing site gains access to the device programming jobs 206, it would not be possible for the assembly controller 108 to decrypt the manufacturing process or the intellectual property within the signed manifest 218.

The timestamp 234 is a sequence of characters or encoded information identifying when a certain event occurs. For example, the timestamp 234 can include a specific date, a time of a day, or a combination thereof. Also for example, the timestamp 234 can be accurate to a predetermined fraction of a second. As a specific example, the timestamp 234 can be accurate to tenths of a second, hundredths of a second, or any other fractions of a second.

A two-part check 236 using the check values 220 and the signed manifest 218 creates a redundancy in security where if any of the files changes, the error 230 is detected and thus prevents the decryption of the signed manifest 218. Besides the list of the files 222, other files can be added to the package, but as long as original files generated and sent by the job creator 204 pass both checks, the device programming jobs 206 are determined as valid by the automated assembly system 102 and can be safely decrypted, configured, and executed by the automated assembly system 102, the intelligent modules 104, or a combination thereof.

The device programming jobs 206 can include a locked section 238 of information that is locked. For example, the locked section 238 can include configuration Extensible Markup Language (XML) files and the signed manifest 218. Also for example, the locked section 238 can include information that is locked for an algorithm, such as an identity of the assembly devices 106, companies, and quality control (QC). Further, for example, the locked section 238 can include algorithm data description language (DDL) files, FPGA including wrapper, configuration XML, the signed manifest 218, language codes including En-US, parentage, and ratings.

The device programming jobs 206 can include an unlocked section 240. For example, the unlocked section 240 can include information that is unencrypted for the algorithm including performance data, other historical data, statuses, and non En-US language code pages. Also for example, the unlocked section 240 can include other information that is not locked in the device programming jobs 206 including operator notes and run log summaries.

Figure 3:
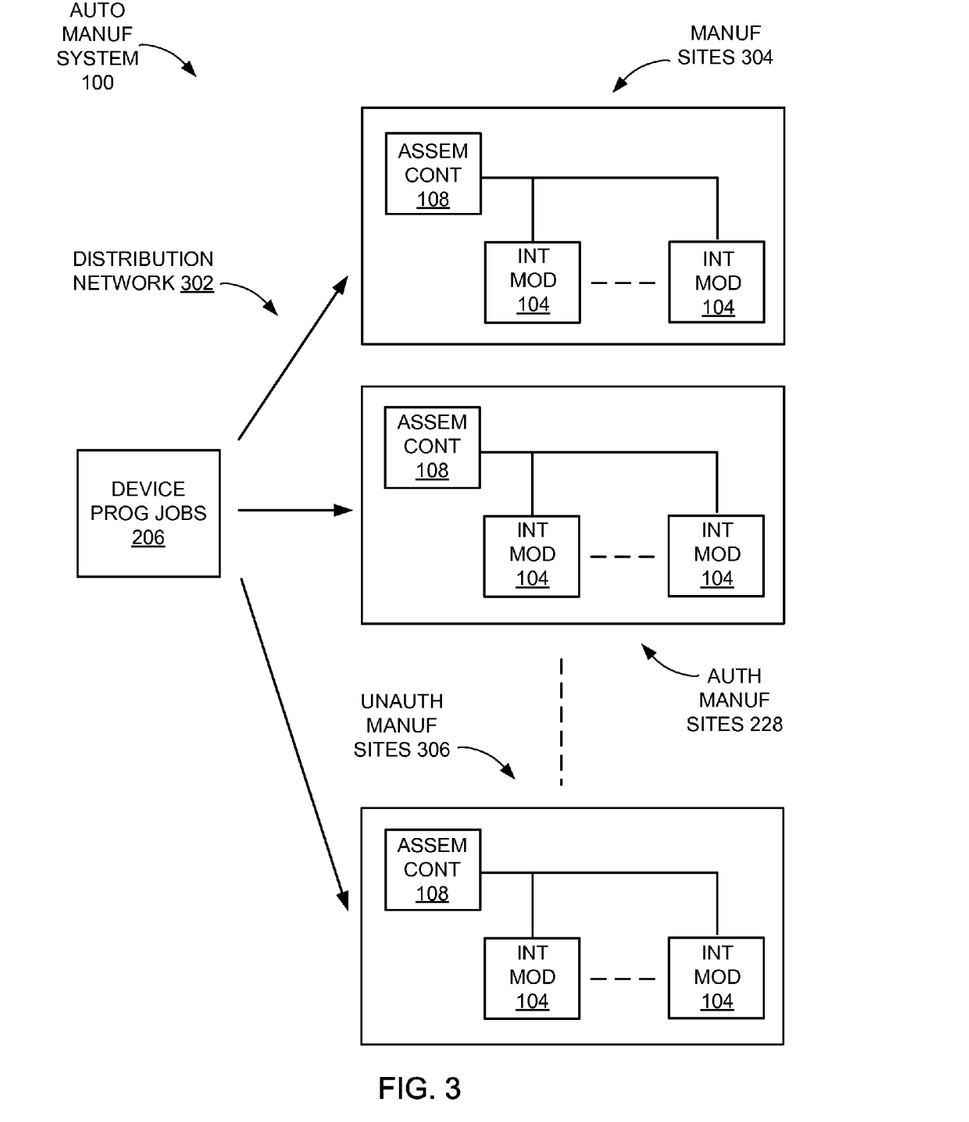
FIG. 3 is another functional block diagram of the automated manufacturing system.

Referring now to FIG. 3, therein is shown another functional block diagram of the automated manufacturing system 100. The functional block diagram depicts a distribution network 302 for distributing the device programming jobs 206 to multiple manufacturing sites 304 for assembly of finished products (not shown).

While only three of the manufacturing sites 304 are shown, it is understood that this is an example and any number to the manufacturing sites 304 can be included in the distribution. The distribution network 302 can employ electronic distribution, media distribution, or optical distribution devices to transport the device programming jobs 206 to multiple of the manufacturing sites 304.

Furthermore, the device programming jobs 206 can be created or generated by the job creator 204 of FIG. 2 at one of the manufacturing sites 304, then deployed or sent to the automated assembly system 102 of FIG. 1 at another of the manufacturing sites 304. In this case, the device programming jobs 206 can be the same jobs that are executed by the intelligent modules 104 at all of the authorized manufacturing sites 228 that are supposed to receive and execute the device programming jobs 206.

In an event when unauthorized manufacturing sites 306 gain access to the device programming jobs 206, the assembly controller 108 at the unauthorized manufacturing sites 306 cannot be able to access either the manufacturing process or the intellectual property included within the device programming jobs 206, due to the encryption applied to the device programming jobs 206 by the job creator 204. The unauthorized manufacturing sites 306 are locations to which the device programming jobs 206 are not originally meant to be sent by the job creator 204, and so the device programming jobs 206 are not allowed to be executed at these locations.

If the device programming jobs 206 have been tampered with in any ways, a decryption process in the assembly controller 108 would fail and the error 230 of FIG. 2 is reported. If the authorized manufacturing sites 228 receive the device programming jobs 206, the automated assembly system 102 configures the assembly controller 108 and the intelligent modules 104 to execute the device programming jobs 206.

It has been discovered that the automated manufacturing system 100 prevents trust issues between the job creator 204 and manufacturers at the manufacturing sites 304 because only the automated assembly system 102 at the authorized manufacturing sites 228 has a capability to unlock encrypted files or the list of the files 222 of FIG. 2 within the device programming jobs 206. Furthermore, the trust issues are prevented because the keys would not pass the two-part check 236 of FIG. 2 at the unauthorized manufacturing sites 306.

It has also been discovered that the automated manufacturing system 100 prevents unauthorized accesses to or tampering with the instruction set 210 of FIG. 2 having a secret "recipe" or algorithm of the manufacturing process and thus protects the instruction set 210. The unauthorized accesses and the tampering with the instruction set 210 are prevented by using the two-part check 236 in the assembly controller 108.

It has further been discovered that the automated manufacturing system 100 allows the device programming jobs 206 to be created on one of the manufacturing sites 304, then deployed to another of the manufacturing sites 304 and have a guarantee that it will be the same jobs at all of the authorized manufacturing sites 228 that are to execute the device programming jobs 206.

It has further been discovered that the automated manufacturing system 100 protects an overall manufacture process since the device programming jobs 206 describe how and what to program as well as where on the intelligent modules 104 the intellectual property is to be applied. The description of the device programming jobs 206 is based on the list of the files 222 including the instruction set 210, the control settings 212 of FIG. 2, the program data 214 of FIG. 2, and the job settings 216 of FIG. 2 that are included in the signed manifest 218 of FIG. 2.

It has further been discovered that the automated manufacturing system 100 provides an ability to store additional information such as those in the unlocked section 240 of FIG. 2 of the device programming jobs 206 that do not involve encryption to be tamper proof, such as the operator notes and the performance data, without affecting the locked section 238 of FIG. 2 of the device programming jobs 206.

It has further been discovered that the embodiments of the automated manufacturing system 100 provide secure distribution of the device programming jobs 206, without expensive and time consuming protocols, to multiple of the manufacturing sites 304 as changes in demands for manufacturing capacity occur. The capability of the secure distribution allows capacity control of the finished products (not shown) without the risk of unauthorized manufacture or the loss of the intellectual property.

Figure 4:
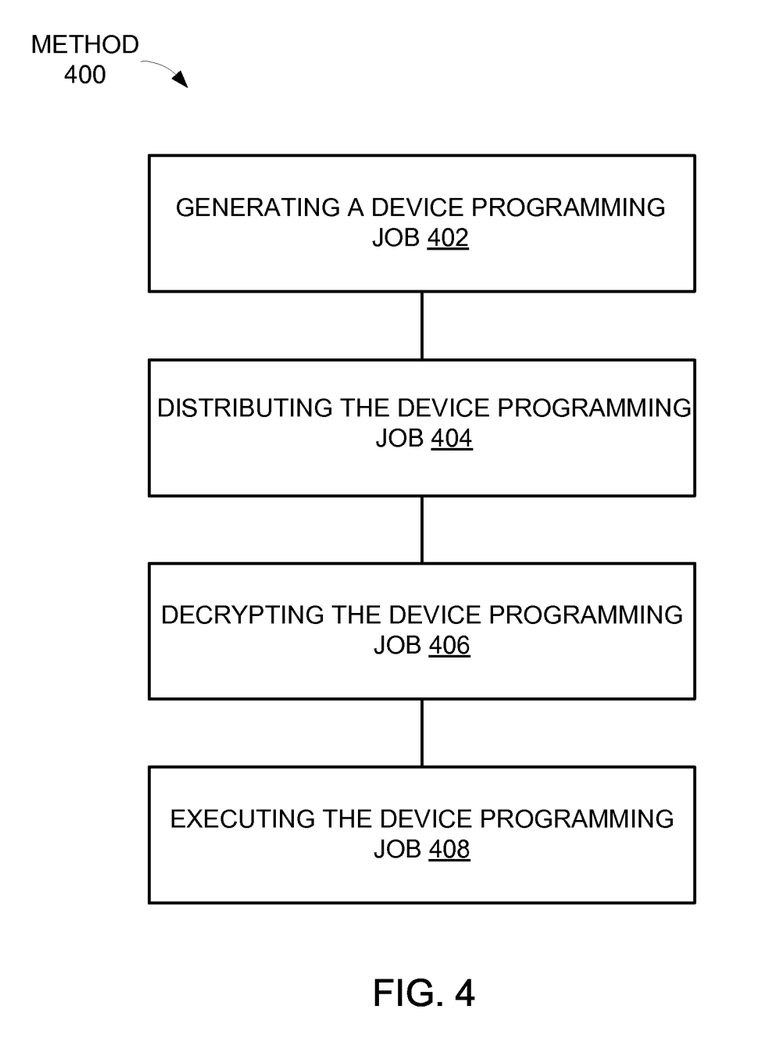
FIG. 4 is a flow chart of a method of operation of an automated manufacturing system in a further embodiment of the present invention.

Referring now to FIG. 4, therein is shown a flow chart of a method 400 of operation of an automated manufacturing system in a further embodiment of the present invention. The method 400 includes: generating a device programming job by encrypting a file based on an input component, the input component including an instruction set in a block 402; distributing the device programming job to a manufacturing site in a block 404; decrypting the device programming job at an authorized manufacturing site in a block 406; and executing the device programming job decrypted by an assembly controller at the authorized manufacturing site for programming an assembly device in a block 408.

From the above it will be understood that the embodiments of the present invention is applicable to what can be described as "devices" or "media". Devices and/or media include a broad range of electronic and mechanical devices. The best mode describes programming of the assembly devices 106 of FIG. 1 and/or media, which include, but are not limited to, Flash memories (Flash), electrically erasable programmable read only memories (EEPROM), programmable logic devices (PLDs), field programmable gate arrays (FPGAs), and microcontrollers.

However, the embodiments of the present invention encompasses programming for all electronic, mechanical, hybrid, and other devices or media, which require testing, measurement of device characteristics, calibration, and other programming operations. For example, these types of devices and/or media would include, but not be limited to, microprocessors, integrated circuits (ICs), application specific integrated circuits (ASICs), micro mechanical machines, micro-electro-mechanical (MEMs) devices, micro modules, and fluidic systems.

It has been discovered that the embodiments of the present invention thus has numerous aspects. A principle aspect is that the automated manufacturing system 100 of FIG. 1 automatically recognizes authorized assembly device information, such as the identification of the module (e.g., the type of module, the configuration of the module, and the geometry of the module) and the location of the module through a composite connection. The automatic recognition of the assembly devices 106 by the assembly controller 108 of FIG. 1 reduces operator setup time and insures the device programming jobs 206 of FIG. 2 is only executed by the authorized manufacturing sites 228 of FIG. 2.

Another aspect of the embodiments of the present invention is that the automated manufacturing system 100 employs an on-board vacuum system. Consequently, the automated manufacturing system 100 now becomes a self-sufficient, highly portable system that only requires an electrical current for operation.

These and other valuable aspects of the embodiments of the present invention consequently further the state of the technology to at least the next level.

Thus, it has been discovered that the automated manufacturing system 100 of the embodiments of the present invention furnishes important and heretofore unknown and unavailable solutions, capabilities, and functional aspects. For instance, the automated manufacturing system 100 of the embodiments of the present invention employs a smart interface system that reduces operator setup time. The resulting processes and configurations are straightforward, cost-effective, uncomplicated, highly versatile and effective, can be implemented by adapting known technologies, and are thus readily suited for efficient and economical manufacturing.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the scope of the included claims. All matters hithertofore set forth herein or shown in the accompanying drawings are to be interpreted in an illustrative and non-limiting sense.

What is claimed is:

1. A method of operation of an electronic media device manufacturing system comprising:
   receiving a device programming job that controls a device programmer that programs an electronic media device, the device programming job having by encrypting a file based on an input component, the input component including an instruction set, the device programming job includes a check value of the file, the device programming job having the file and the check value serialized, the device programming job having a a-signed manifest with the input component and the check value, the signed manifest encrypted by a private key, and the electronic media device is any of: a flash memory, an electrically erasable programmable read only memory, a programmable logic device, a field programmable gate array, an application specific integrated circuit, or a microcontroller;
   decrypting the signed manifest in the device programming job using the private key;
   validating the input component based on the check value indicating a successful validation; and
   executing the device programming job including configuring the device programmer with the instruction set to program the electronic media device.

2. The method as claimed in claim 1 wherein receiving the device programming job includes receiving the device programming job having portions encrypted with a private key.

3. The method as claimed in claim 1 further comprising generating an error when the device programming job is processed at an authorized manufacturing site and the file has been changed.

4. The method as claimed in claim 1 wherein receiving the device programming job includes receiving the device programming job having an unlocked section unencrypted.

5. A method of operation of an electronic media device manufacturing system comprising:

receiving a private key;

receiving a device programming job that controls a device programmer that programs an electronic media device, the device programming job having a list of files based on input components, the input components including an instruction set, control settings, program data, job settings, or a combination thereof, the device programming job includes a check value for each file in the list of files, the device programming job having each file in the list of files and the check value serialized, the device programming job having a signed manifest with the each file and the check value associated with the input components, and the electronic media device is any of: a flash memory, an electrically erasable programmable read only memory, a programmable logic device, a field programmable gate array, an application specific integrated circuit, or a microcontroller;

decrypting the signed manifest in device programming job using the private key;

validating each of the input components based on the associated check values indicating a successful validation; and executing the device programming job including configuring the device programmer with the instruction set to the electronic media device in the receptacle.

6. The method as claimed in claim 5 wherein receiving the device programming job includes receiving the device programming job having a check value calculated individually for each of the instruction set, the control settings, the program data, and the job settings.

7. The method as claimed in claim 5 wherein receiving the device programming job includes receiving the device programming job and the signed manifest encrypted with a private key.

8. The method as claimed in claim 5 wherein:
receiving the device programming job includes receiving the signed manifest encrypted with a private key; and
further comprising:
generating an error when the device programming job is processed at an authorized manufacturing site, and the files or the signed manifest has been changed.

9. The method as claimed in claim 5 wherein receiving the device programming job includes receiving the device programming job having an unlocked section unencrypted, the device programming job encrypted based on a private key having a timestamp.

10. An electronic media device manufacturing system comprising:
a device programmer that receives a device programming job that controls the device programmer to program the electronic media device, the device programming job having device a file based on an input component, the input component including an instruction set, the device programming job includes a check value of the file, the device programming job having the file and the check value serialized, the device programming job having a signed manifest with the input component and the check value, the signed manifest encrypted by a private key, the device programmer configured with the instruction set to program the electronic media device, and the electronic media device is any of: a flash memory, an electrically erasable programmable read only memory, a programmable logic device, a field programmable gate array, an application specific integrated circuit, or a microcontroller; and an assembly controller coupled to the device programmer to decrypt the signed manifest in the device programming job using the private key based on the check value indicating a successful validation.

11. The system as claimed in claim 10 wherein the device programmer receives portions of the device programming job encrypted based on a private key.

12. The system as claimed in claim 10 wherein the assembly controller generates an error when the device programming job is processed at an authorized manufacturing site and the file has been changed.

13. The system as claimed in claim 10 wherein the device programming receives the device programming job having an unlocked section unencrypted.

14. The system as claimed in claim 10 wherein the device programmer receives the device programming job having input components including the instruction set, control settings, program data, job settings, or a combination thereof.

15. The system as claimed in claim 14 wherein the device programmer receives the device programming job having a check value individually calculated for each of the instruction set, the control settings, the program data, and the job settings.

16. The system as claimed in claim 14 wherein the device programmer receives the device programming job and the signed manifest encrypted with a private key.

17. The system as claimed in claim 14 wherein:
the device programmer receives the signed manifest having the files and a private key; and
the assembly controller generates an error when the device programming job is processed at an authorized manufacturing site, and the files or the signed manifest has been changed.

18. The system as claimed in claim 14 wherein the device programmer receives the files encrypted based on a private key having a timestamp.

* * * * *

UNITED STATES PATENT AND TRADEMARK OFFICE
CERTIFICATE OF CORRECTION

| | |
|---|---|
| PATENT NO. | : 10,303,891 B2 |
| APPLICATION NO. | : 14/945399 |
| DATED | : May 28, 2019 |
| INVENTOR(S) | : Taylor Carl Ekie |

It is certified that error appears in the above-identified patent and that said Letters Patent is hereby corrected as shown below:

In the Claims

Column 10
Claim 1: Line 36: Delete "by encrypting"
Claim 1: Line 42: Delete "a-signed" and insert --signed--

Column 12
Claim 10: Line 1: Delete "device"

Signed and Sealed this
Twenty-fifth Day of June, 2019

Andrei Iancu
*Director of the United States Patent and Trademark Office*